United States Patent [19]

Kishida et al.

[11] Patent Number: 5,064,906
[45] Date of Patent: Nov. 12, 1991

[54] THERMOPLASTIC RESIN COMPOSITIONS HAVING EXCELLENT IMPACT RESISTANCE, WEATHER RESISTANCE AND MOLDABILITY, AND PROCESS FOR PREPARING THE SAME

[75] Inventors: Kazuo Kishida, Hiroshima; Yutaka Toyooka; Haruyoshi Kitahara, both of Ohtake, all of Japan

[73] Assignee: Mitsubishi Rayon Co., Ltd., Tokyo, Japan

[21] Appl. No.: 405,428

[22] Filed: Aug. 28, 1989

Related U.S. Application Data

[62] Division of Ser. No. 10,426, Feb. 3, 1987, Pat. No. 4,912,162.

[30] Foreign Application Priority Data

Feb. 6, 1986 [JP] Japan ................................. 61-24533

[51] Int. Cl.$^5$ .................... C08F 265/10; C08F 279/02
[52] U.S. Cl. .................................... 525/293; 525/301; 525/302; 525/305; 525/310; 525/315; 525/316; 525/902
[58] Field of Search ................. 525/67, 293, 301, 302, 525/305, 310, 315, 316, 902

[56] References Cited

U.S. PATENT DOCUMENTS

| 4,393,172 | 7/1983 | Lindner et al. | 525/305 |
| 4,912,162 | 3/1990 | Kishida et al. | 525/67 |

FOREIGN PATENT DOCUMENTS

| 034748 | 9/1981 | European Pat. Off. . |
| 077038 | 4/1983 | European Pat. Off. . |

*Primary Examiner*—Jacob Ziegler
*Attorney, Agent, or Firm*—Oblon, Spivak, McClelland, Maier & Neustadt

[57] ABSTRACT

Disclosed is a graft copolymer resin prepared by graft polymerizing a vinyl compound onto a composite-structured acrylic rubber whose particles are composed of a core consisting of a diene rubber enlarged by treatment with an acid group-containing copolymer latex, and an outer layer consisting of an acrylate polymer having a crosslinked structure formed by the combined use of a graft-linking agent and a cross-linking agent. This graft copolymer resin may be blended with a rigid thermoplastic resin in a specific proportion. This resin composition imparts a good gloss to the molded articles formed therefrom, while retaining excellent impact resistance and weather resistance.

6 Claims, No Drawings

THERMOPLASTIC RESIN COMPOSITIONS HAVING EXCELLENT IMPACT RESISTANCE, WEATHER RESISTANCE AND MOLDABILITY, AND PROCESS FOR PREPARING THE SAME

This is a division of application Ser. No. 010,426, filed on Feb. 3, 1987, now U.S. Pat. No. 4,912,162.

BACKGROUND OF THE INVENTION

1. Field of the Invention

This invention relates to a thermoplastic resin composition having excellent impact resistance, weather resistance and moldability, as well as to a process for preparing the same.

2. Description of the Prior Art

Among impact-resistant resins is ABS resin which forms a two-phase resin composed of resin and rubber. However, it is well known that ABS resin is subject to deterioration by ultraviolet light or the like and hence exhibits poor weather resistance, because the butadiene-based polymer consituting its rubber component for imparting impact resistance to the resin has a large number of chemically unstable double bonds in its backbone.

In order to improve the weather resistance of ABS resin, there has been proposed a process for the preparation of a resin composition by using a saturated rubbery polymer having few double bonds in its backbone. One typical example is a resin composition containing an acrylic ester-based rubber. Although this saturated rubber is stable to ultraviolet light, it is difficult to establish therein a crosslinked rubber or grafted structure which is an essential requirement for two-phase resins composed of resin and rubber, because the rubber has no active site for cross-linking or grafting. Thus, such resin compositions have the disadvantages of being softer, having a lower elastic modulus, and exhibiting slower elastic recovery as compared with those containing a diene rubber. For these reasons, when a resin composition analogous to ABS resin but containing such a saturated rubber is used as an injection molding material, the rubber particles exhibit a marked orientation, producing an iridescent luster on the entire surfaces of molded articles or in a definite direction of flow of the material. Moreover, when such a resin composition is colored with a pigment or the like, the above-described tendency becomes more pronounced and thereby causes a decrease in commercial value. In order to overcome these disadvantages, there have been proposed a process involving copolymerization in the presence of a selected cross-linking agent, a process involving peroxide cross-linking, processes using a composite-structured crosslinked acrylic containing a diene rubber within the particle, as disclosed in Japanese Patent Publication No. 47863/'72, Japanese Patent Laid-Open Nos. 86918/'81, 133311/'81, 167308/'82 and 120663/'83, and U.S. Pat. No. 4,393,172, and the like.

However, in thermoplastic resins proposed in the prior arts, the balance between the gloss and impact resistance of molded articles obtained by molding at high temperatures is not quite satisfactory. Specifically, such thermoplastic resins have the disadvantage that, when they are molded in a wide temperature range extending from low to high temperatures, the resulting molded articles cannot always retain a high gloss. Thus, a thermoplastic resin having a combination of excellent impact resistance, weather resistance and moldability has not been available in the prior arts.

In view of these circumstances, the present inventors conducted an intensive research for the purpose of improving the balance between the impact resistance and gloss of molded articles formed under molding conditions ranging from low to high temperatures and have found that the above-described problems can be solved, i.e., a thermoplastic resin composition having a combination of excellent impact resistance, weather resistance and moldability can be obtained, by forming a graft copolymer resin through polymerization of at least one monomer selected from the group consisting of aromatic vinyl compounds and ethylenically unsaturated compounds, in the presence of a latex containing a composite-structured acrylic rubber whose particles are composed of a core consisting of an enlarged diene rubber prepared by treating a diene rubber latex of smaller particle size with an acid group-containing copolymer latex, and an outer layer consisting of a cross-linked acrylate polymer derived from an acrylic ester as the main component and formed by the combined use of a graft-linking agent and a cross-linking agent. The present invention has been completed on the basis of this finding.

SUMMARY OF THE INVENTION

It is an object of the present invention to provide an impact-resistant and weather-resistant thermoplastic resin composition having excellent moldability and, in particular, imparting a good gloss to the molded articles formed therefrom.

According to the present invention, there is provided a thermoplastic resin composition having excellent impact resistance, weather resistance and moldability which comprises (A) a graft copolymer resin (3) obtained by polymerizing 10 to 95 parts by weight of at least one monomer (2) selected from the group consisting of aromatic vinyl compounds and ethylenically unsaturated compounds of the general formula

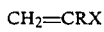

where R is —H or —CH$_3$, X is —CN or —COOR$^1$, and R$^1$ is an alkyl group having 1 to 8 carbon atoms, in the presence of 90 to 5 parts by weight (on a solid basis) of a latex of a composite-structured crosslinked acrylic rubber (1) whose particles are composed of 2 to 80% by weight of a core consisting of a diene rubber (i) enlarged by treatment with an acid group-containing copolymer latex, and 20 to 98% by weight of an outer layer consisting of a crosslinked acrylate polymer (ii) derived from an acrylic ester as the main component and formed by the combined use of a graft-linking agent and a cross-linking agent, the total amount of (1) and (2) being 100 parts by weight; or (B) a blend obtained by blending the graft copolymer resin (3) with a rigid thermoplastic resin (4) in such a proportion that the amount of the composite-structured crosslinked acrylic rubber (1) present in the resulting resin composition is 5 to 80% by weight based on the total amount of (3) and (4).

According to the present invention, there is also provided a process for the preparation of a thermoplastic resin composition having excellent impact resistance, weather resistance and moldability which comprises (A) forming a graft copolymer resin (3) by polymerizing 10 to 95 parts by weight of at least one monomer (2) selected from the group consisting of aromatic vinyl compounds and ethylenically unsaturated compounds of the general formula $$CH_2=CRX$$

where R is —H or —CH$_3$, X is —CN or —COOR$^1$, and R$^1$ is an alkyl group having 1 to 8 carbon atoms, in the presence of 90 to 5 parts by weight (on a solid basis) of a latex of a composite-structured crosslinked acrylic rubber (1) whose particles are composed of 2 to 80% by weight of a core consisting of a diene rubber (i) enlarged by treatment with an acid group-containing copolymer latex, and 20 to 98% by weight of an outer layer consisting of a crosslinked acrylate polymer (ii) derived from an acrylic ester as the main component and formed by the combined use of a graft-linking agent and a cross-linking agent, the total amount of (1) and (2) being 100 parts by weight; and (B) optionally blending the graft copolymer resin (3) with a rigid thermoplastic resin (4) in such a proportion that the amount of the composite-structured crosslinked acrylic rubber (1) present in the resulting resin composition is 5 to 80% by weight based on the total amount of (3) and (4).

In the present invention, the enlarged diene rubber (i) constituting the core of the particles of the composite-structured crosslinked acrylic rubber (1) comprises 100 to 50% by weight of 1,3-butadiene and 0 to 50% by weight of a monomer having a $CH_2=C<$ group and being copolymerizable therewith, the total amount of these monomers being 100% by weight. The enlarged diene rubber (i) is 1,3-polybutadiene homopolymer or a copolymer comprising 50% by weight or more of 1,3-butadiene units. Examples of such copolymers include butadiene-aromatic vinyl compound copolymers such as butadiene-styrene copolymer and butadiene-vinyltoluene copolymer; butadiene-acrylonitrile copolymer; butadiene-methacrylonitrile copolymer; butadiene-alkyl acrylate copolymers such as butadiene-methyl acrylate copolymer, butadiene-ethyl acrylate copolymer, butadiene-butyl acrylate copolymer and butadiene-2-ethylhexyl acrylate copolymer; butadiene-alkyl methacrylate copolymers such as butadiene-methyl methacrylate copolymer and butadiene-ethyl methacrylate copolymer; and the like, and further include terpolymers comprising 50% by weight or more of 1,3-butadiene units. Usually, they can be readily prepared according to well-known emulsion polymerization techniques. No particular limitation is placed on the types of the catalyst, emulsifier and the like used in the preparation of these diene rubbers, but a variety of catalysts, emulsifiers and the like may be used. These rubbers should preferably have an average particle diameter of 0.04 to 0.2 μm.

In the present invention, an acid group-containing copolymer latex is used to enlarge the particles present in a latex of the aforesaid diene rubber. It is essential that this acid group-containing copolymer latex be composed of an acid group-containing monomer and an alkyl acrylate. Useful examples of the acid group-containing monomer include acrylic acid, methacrylic acid, itaconic acid and crotonic acid. As the alkyl acrylate, there is used at least one alkyl acrylate of 1 to 12 carbon atoms in the alkyl group.

If other monomers such as methacrylic esters, styrene, acrylonitrile and the like are used in place of the alkyl acrylate, no particle-enlarging effect will be produced. However, it is possible to replace less than half of the alkyl acrylate with other monomers as described above.

The acid group-containing monomer is used in an amount of 3 to 30% by weight based on the total amount of the monomers constituting the acid group-containing copolymer. If the amount of acid group-containing monomer used is less than 3% by weight, little particle-enlarging effect will be produced. If it is greater than 30% by weight, the particle-enlarging effect is so powerful that there may be an undesirable tendency toward the formation of excessively large particles having a diameter of greater than 1 μm.

The optimum content of the acid group-containing monomer also depends on the degree of hydrophilic property of the alkyl acrylate used. Where the alkyl acrylate has a high degree of hydrophilic property, a particle-enlarging effect is produced at a low content of the acid group-containing monomer. In this case, a high content of the acid group-containing monomer is undesirable because the latex may be destroyed. On the contrary, where the alkyl acrylate has a low degree of hydrophilic property, little particle-enlarging effect is produced at a low content of the acid group-containing monomer. In other words, a satisfactory effect cannot be produced unless the content of the acid group-containing monomer exceeds a certain level. More specifically, where highly hydrophilic alkyl acrylates such as methyl acrylate and ethyl acrylate are used, the optimum content of the acid group-containing monomer is in the range of 5 to 10% by weight. On the contrary, where hydrophobic alkyl acrylates having 4 or more carbon atoms in the alkyl group, such as butyl acrylate and 2-ethylhexyl acrylate, are used, the optimum content of the acid group-containing monomer is in the range of 13 to 20% by weight. It is to be noted that, where highly hydrophilic alkyl acrylates are used, the system tends to become unstable and produce cullets (coarse particles) even if the content of the acid group-containing monomer is in the range of 5 to 10% by weight. By contrast, where hydrophobic alkyl acrylates are used, the system remains stable and uniformly enlarged particles are obtained in most cases.

In addition to the aforesaid acid group-containing monomers, cinnamic acid, maleic anhydride, butenetricarboxylic acid and the like are usable. However, these monomers are not suitable for practical purposes because of their low particle-enlarging power.

The acid group-containing copolymer is used in the form of a latex. Its particle size has a great influence on its particle-enlarging power, and the preferred range of its average particle diameter is from 0.05 to 0.2 μm. If its average particle diameter is smaller than 0.05 μm, its particle-enlarging power will be significantly reduced. If it is larger than 0.2 μm, the enlarged rubber particles will have an excessively large diameter and, therefore, they may become unstable and tend to agglomerate during subsequent graft polymerization.

The particle enlargement of the diene rubber is effected by adding the acid group-containing copolymer latex to a latex of the diene rubber having a small particle diameter of, for example, 0.04 to 0.2 μm. The acid group-containing copolymer latex is added in an amount of 0.1 to 10 parts by weight (on a solid basis) per 100 parts by weight (on a solid basis) of the base diene rubber latex. It is especially preferable to add the acid group-containing copolymer latex in an amount of 0.5 to 5 parts by weight. By using the aforesaid amount, the average particle diameter of the enlarged diene rubber (i) latex is adjusted to a value of 0.15 to 1 μm. Thus, the resulting latex of the composite-structured crosslinked acrylic rubber containing the aforesaid rubber as a core will have an average particle diameter of 0.18 to 3 μm which is preferable from the viewpoint of the appearance of molded articles.

In the treatment for enlarging the particles of the diene rubber in accordance with the present invention, it is preferable to maintain the latex of the base diene rubber at a pH of 7 or higher. If its pH is in the acid region, the addition of the acid group-containing copolymer latex will produce little particle-enlarging effect so that it may be difficult to prepare the desired resin composition of the present invention advantageously.

In order to maintain the latex of the base diene rubber at a pH of 7 or higher, pH adjustment may be made either during the polymerization of the base diene rubber or prior to the particle-enlarging treatment.

In the present invention, the crosslinked acrylate polymer (ii) constituting the outer layer of rubber particles is formed by the combined use of a graft-linking agent and a cross-linking agent. As the acrylic ester constituting the main component (50% by weight or more) of this polymer (ii), there may be used, for example, alkyl acrylates of 1 to 12 carbon atoms in the alkyl group, such as methyl, ethyl, n-propyl, n-butyl, 2-ethylhexyl or n-lauryl; haloalkyl acrylates such as chloroethyl acrylate; aromatic acrylic esters such as benzyl acrylate or phenetyl acrylate; and the like.

The monomers copolymerizable with these acrylic esters include methacrylic esters such as methyl methacrylate and butyl methacrylate; acrylonitrile; styrene; and the like. According to need, these monomers may be used in an amount of less than 50% by weight of the polymer (ii).

In order to form a crosslinked structure in the aforesaid acrylate polymer, it is a common practice to polymerize a monomer or monomer mixture containing the aforesaid acrylic ester as the main ingredient by using a graft-linking agent or a cross-linking agent separately. However, one of the most important feature of the present invention is that the problem of poor moldability resulting from the conventional crosslinked structure formed by the separate use of a graft-linking agent or a cross-linking agent can be solved by the combined use of a graft-linking agent and a cross-linking agent in the formation of a crosslinked structure in the aforesaid acrylate polymer. The graft-linking agent used for this purpose is a compound which contains 2 or 3 unsaturated groups having addition polymerizability and in which these unsaturated groups are markedly different from each other in polymerization reactivity, and examples thereof include allyl esters of unsaturated acids such as acrylic acid, methacrylic acid, maleic acid, fumaric acid, cyanuric acid and isocyanuric acid. Among these compounds, allyl methacrylate, triallyl cyanurate and triallyl isocyanurate are preferably used. These compounds may be used either alone or in an admixture of two or more. On the other hand, the cross-linking agent is a compound which contains a plurality of unsaturated groups having addition polymerizability and in which these unsaturated groups are almost equal to or slightly different from each other in polymerization reactivity, and examples thereof include diacrylic or dimethacrylic esters of polyalkylene glycols and divinylbenzene. Among these compounds, ethylene glycol dimethacrylate, 1,3-butanediol dimethacrylate and divinylbenzene are preferably used. These compounds may be used either alone or in an admixture of two or more.

In the preparation of the thermoplastic resin composition of the present invention, the particles of the enlarged diene rubber (i) can be covered with the crosslinked acrylate polymer (ii) in the following manner:

First, the enlarged diene rubber (i) is prepared by emulsion polymerization of a diene monomer and the like and subsequent particle-enlarging treatment with an acid group-containing copolymer latex. Then, the so-called seed polymerization is carried out. That is, 20 to 98% by weight, preferably 50 to 95% by weight, of a mixture of monomers for the formation of a crosslinked acrylate polymer is polymerized in the presence of 2 to 80% by weight (on a solid basis), preferably 5 to 50% by weight, of the enlarged diene rubber latex obtained in the above-described manner. In view of the balance between resin properties such as the appearance and impact strength of molded articles, the composite-structured crosslinked acrylic rubber (1) should desirably have a degree of swelling (i.e., the ratio of the weight of the swollen rubber having been soaked in methyl ethyl ketone and allowed to stand at 30° C. for 24 hours, to its absolute dry weight) of 4 to 16 and preferably 6 to 9. In order to control the degree of swelling so as to fall within the aforesaid range, it is preferable to use the aforesaid graft-linking agent and cross-linking agent in a combined amount of 0.1 to 10% by weight based on the monomers used for the formation of an acrylate polymer. If the combined amount of the graft-linking agent and cross-linking agent is less than 0.1% by weight, the degree of swelling will be outside the aforesaid range and this may be undesirable from the viewpoint of the appearance of molded articles. If it is greater than 10% by weight, the impact resistance will tend to decrease. This seed polymerization should be carried out in such a way that the particles of the enlarged diene rubber are completely coated with the crosslinked acrylic rubber. If not, it is impossible to obtain a resin having a combination of attractive appearance and excellent weather resistance.

Thereafter, 10 to 95 parts by weight of at least one monomer (2) selected from the group consisting of aromatic vinyl compounds and ethylenically unsaturated compounds of the general formula $$CH_2 = CRX$$

where R is —H or —CH$_3$, X is —CN or —COOR$^1$, and R$^1$ is an alkyl group having 1 to 8 carbon atoms, is polymerized in the presence of 90 to 5 parts by weight (on a solid basis) of the latex of the composite-structured crosslinked acrylic rubber (1) obtained in the above-described manner, provided that the combined amount of (1) and (2) is 100 parts by weight. This polymerization is carried out in the presence of a radical initiator by adding the monomer (2) to the latex at a time, in portions or continuously. Where a large amount of monomer is to be added, continuous pouring is preferred in order to maintain the melt flow properties of the resulting polymer and promote the formation of a graft polymer.

Typical examples of the aforesaid aromatic vinyl compounds include styrene, α-methylstyrene and vinyltoluene. Typical examples of the ethylenically unsaturated compounds of the general formula CH$_2$=CRX include acrylonitrile; methacrylonitrile; methyl, ethyl, propyl, butyl and like esters of acrylic acid or methacrylic acid.

The graft copolymer resin (3) thus obtained may be directly used as the thermoplastic resin composition of the present invention. Alternatively, this graft copolymer resin (3) may also be used in the form of a blend obtained by blending it with a separately prepared rigid thermoplastic resin (4) in such a proportion that the amount of the composite-structured crosslinked acrylic rubber (1) present in the resulting resin composition is 5 to 80% by weight based on the total amount of (3) and (4). As the aforesaid rigid thermoplastic resin (4), there may be used any thermoplastic resin that is rigid at ordinary temperatures. However, preferred examples thereof include aromatic vinyl compound-acrylonitrile copolymers, more preferably styrene-acrylonitrile copolymer, α-methylstyrene-acrylonitrile copolymer and styrene-α-methylstyrene-acrylonitrile terpolymer; aromatic vinyl compound-methyl methacrylate copolymers, more preferably styrene-methyl methacrylate copolymer; aromatic vinyl compound-acrylonitrile-methyl methacrylate terpolymers, more preferably styrene-acrylonitrile-methyl methacrylate terpolymer; aromatic vinyl compound-acrylonitrile-lower alkyl acrylate terpolymers; acrylonitrile-lower alkyl acrylate copolymers; polymethyl methacrylate; polymers containing N-phenylmaleimide as an essential component; and polycarbonates. These rigid thermoplastic resins may be used either alone or in an admixture of two or more.

The thermoplastic resin composition prepared by the process of the present invention and having excellent impact resistance, weather resistance and moldability can additionally contain various colorants such as dyes and pigments; light or heat stabilizers; granular, powdery or fibrous inorganic fillers and organic fillers; and blowing agents, according to need. This composition can be processed by various processing techniques such as injection molding or extrusion molding, and can be used as a variety of molded articles having excellent impact resistance and weather resistance, or as a component of laminated structures (for example, as the outermost layer exposed to sunlight).

The present invention is further illustrated by the following examples. In these examples, percentages and parts are by weight. Particle diameters were obtained by determining the particle diameter of a rubber or resin latex by electron microscopy, constructing a calibration curve using the absorbance at 700 nm of a diluted solution (0.15 g/l) of the latex, measuring the absorbance of the latex to be tested, and determining its particle diameter by reference to the calibration curve.

The gel content and degree of swelling of composite-structured crosslinked acrylic rubbers (1) were calculated from the following equations:

$$\text{Gel content} = \frac{W_2}{W_0} \times 100 \, (\%)$$

$$\text{Degree of swelling} = \frac{W_1 - W_2}{W_2}$$

where $W_0$ is the original weight of a sample, $W_1$ is the weight of the sample which has been soaked in about 150 volumes of methyl ethyl ketone and allowed to stand at 30° C. for 24 hours, and $W_2$ is the absolute dry weight of the same sample.

EXAMPLES 1–7

(I) Synthesis of enlarged diene rubbers (A)

1) Synthesis of enlarged diene rubber (A-1)
First, a base rubber (a-1) was synthesized as follows:

| | |
|---|---|
| 1,3-Butadiene | 66 parts |
| n-Butyl acrylate (BuA) | 9 parts |
| Styrene (ST) | 25 parts |
| Diisopropylbenzene hydroperoxide | 0.2 part |
| Potassium oleate | 1.0 part |
| Disproportionated potassium rosinate | 1.0 part |
| Sodium pyrophosphate | 0.5 part |
| Ferrous sulfate | 0.005 part |
| Dextrose | 0.3 part |
| Anhydrous sodium sulfate | 0.3 part |
| Deionized water | 200 parts |

A mixture consisting of the above ingredients was charged into a 100-liter autoclave and polymerized at 50° C. The polymerization was alsmost completed in 9 hours, resulting in a degree of conversion of 97%. Thus, there was obtained a rubber latex having an average particle diameter of 0.08 μm and a pH of 9.0. Separately, a latex of an acid group-containing copolymer (B) for use in particle-enlarging treatment was synthesized as follows:

| | |
|---|---|
| BuA | 85 parts |
| Methacrylic acid (MAA) | 15 parts |
| Potassium oleate | 2 parts |
| Dioctyl sodium sulfosuccinate | 1 part |
| Cumene hydroperoxide | 0.4 part |
| Formaldehyde sodium sulfoxylate | 0.3 part |
| Deionized water | 200 parts |

A mixture consisting of the above ingredients was charged into another polymerization apparatus and polymerized at 70° C. for 4 hours, resulting in a degree of conversion of 98%. Thus, there was obtained a latex having an average particle diameter of 0.08 μm. To 100 parts (on a solid basis) of the latex of the base rubber (a-1) was added 2 parts (on a solid basis) of the above latex of the acid group-containing copolymer (B) with stirring. This mixture was further stirred for 30 minutes to obtain an enlarged diene rubber latex (A-1) having an average particle diameter of 0.27 μm.

2) Synthesis of enlarged diene rubber (A-2)
First, a base rubber (a-2) was synthesized as follows:

| | |
|---|---|
| 1,3-Butadiene | 100 parts |
| Diisopropylbenzene hydroperoxide | 0.2 part |
| tert-Dodecyl mercaptan | 0.5 part |
| Potassium oleate | 1.0 part |
| Disproportionated potassium rosinate | 1.0 part |
| Sodium pyrophosphate | 0.5 part |
| Ferrous sulfate | 0.005 part |
| Dextrose | 0.3 part |
| Anhydrous sodium sulfate | 0.4 part |
| Deionized water | 200 parts |

A mixture consisting of the above ingredients was charged into a 100-liter autoclave and polymerized at 50° C. The polymerization was almost completed in 9 hours, resulting in a degree of conversion of 96%. Thus, there was obtained a base rubber latex (a-2) having an average particle diameter of 0.08 μm and a pH of 8.8.

To 100 parts (on a solid basis) of this rubber latex was added 2 parts (on a solid basis) of the aforesaid latex of the acid group-containing copolymer (B) with stirring. This mixture was stirred for 30 minutes to obtain an enlarged diene rubber latex (A-2) having an average particle diameter of 0.28 μm.

(II) Preparation of composite-structured crosslinked acrylic rubbers (C)

Twenty parts (on a solid basis) of the enlarged diene rubber latex (A-1) was transferred to a reaction vessel. After the addition of 1 part of disproportionated potassium rosinate and 150 parts of deionized water, the resulting mixture was purged with nitrogen and heated to an internal temperature of 70° C. Then, a solution of 0.12 part of potassium persulfate (KPS) in 10 parts of deionized water was added thereto and a monomer mixture composed of the following ingredients and purged with nitrogen was continuously added dropwise thereto over a period of 2 hours.

| | |
|---|---|
| BuA | 80 parts |
| Allyl methacrylate (AMA) | 0.32 part |
| Ethylene glycol dimethacrylate (EDMA) | 0.16 part |

Upon completion of the addition, the internal temperature ceased to rise; however, the internal temperature was further raised to 80° C. and the reaction was continued for an additional hour. Thus, the rate of polymerization reached 98.8% to yield a composite-structured crosslinked acrylic rubber (C-1) containing a core of an enlarged diene rubber. This composite-structured crosslinked acrylic rubber had a degree of swelling of 6.4, a gel content of 93.0%, and an average particle diameter of 0.28 μm.

In addition, latices of composite-structured crosslinked acrylic rubbers C-2, C-3 and C-4 were prepared under the same conditions as described above, except that the type and amount of enlarged diene rubber latex used and the types and amounts of monomers used for the formation of the crosslinked acrylate polymer were varied as shown in Table 1. The results thus obtained ar shown in Table 1.

TABLE 1

| | Enlarged diene rubber latex (A) | | Monomers for formation of crosslinked acrylate polymer (ii) (parts) | Average particle diameter (μm) | Degree of swelling | Gel content (%) |
|---|---|---|---|---|---|---|
| | Type | Amount used (parts on a solid basis) | | | | |
| C-2 | A-2 | 20 | BuA/AMA/EDMA = 80/0.32/0.16 | 0.31 | 6.6 | 92.0 |
| C-3 | A-2 | 20 | BuA/AMA/DVB* = 80/0.32/0.16 | 0.30 | 6.2 | 92.6 |
| C-4 | A-2 | 50 | BuA/AMA/EDMA = 50/0.2/0.1 | 0.32 | 6.4 | 93.2 |

*DVB: Divinylbenzene.

(III) Preparation of Graft Copolymer Latices (D)

Thirty parts (on a solid basis) of the above latex of the composite-structured crosslinked acrylic rubber (C-1) was charged into a reaction vessel, diluted with 140 parts of deionized water, and heated to 70° C. Separately, 70 parts of a mixture of monomers for use in graft polymerization was prepared by mixing 29% of acrylonitrile (AN) with 71% of ST, dissolving 0.35 part of benzoyl peroxide (BPO) therein, and then purging the resulting mixture with nitrogen. Using a metering pump, this monomer mixture was added to the aforesaid reaction system at a rate of 15 parts per hour. After completion of the addition of all the monomer mixture, the internal temperature of the reaction system was raised to 80° C. and stirring was continued for 30 minutes to obtain a graft copolymer latex (D-1). The rate of polymerization was 99%.

To a portion of the latex (D-1) was added dilute sulfuric acid so as to coagulate the copolymer particles, followed by drying. When the resulting powder was directly extracted with refluxing methyl ethyl ketone, the extract thus obtained had a $\eta_{sp}/C$ of 0.67 as measured in dimethylformamide at 25° C.

In addition, graft copolymers D-2 to D-5 were prepared under the same conditions as described above, except that the type and amount of composite-structured crosslinked acrylic rubber latex used and the types and amounts of monomers used for graft polymerization were varied as shown in Table 2.

TABLE 2

| | Latex of composite-structured acrylic rubber (C) | | Monomers for graft polymerization (parts) |
|---|---|---|---|
| | Type | Amount used (parts on a solid basis) | |
| D-2 | C-2 | 30 | AN/ST = 20.3/49.7 |
| D-3 | C-3 | " | " |
| D-4 | C-4 | " | " |
| D-5 | C-2 | 70 | AN/ST = 8.7/21.3 |

(IV) Salting-out and Pelletization of Polymers

Each of the latices D-1 to D-5 prepared in the above-described manner was coagulated by being added, with stirring, to 3 volumes of a 0.15% aqueous solution (at 90° C.) of aluminum chloride (AlCl$_3$.6H$_2$O).

After completion of the addition of all the latex, the coagulation vessel was heated to an internal temperature of 93° C. and allowed to stand for 5 minutes. After cooling, the resulting coagulum was dehydrated by means of a centrifugal dehydrator, washed and then dried. To 100 parts of each of the resulting powders of the graft copolymers D-1 to D-4 were added 1 part of barium stearate, 0.1 part of a phenolic antioxidant (commercially available from Kawaguchi Kagaku Co. under the trade name of ANTAGE W-300), and 0.5 part of an ultraviolet light absorber (commercially available from Ciba-Geigy Limited under the trade name of TINUVIN P). This mixture was blended in a Henschel mixer at 2000 rpm for 5 minutes. Then, the resulting blend was pelletized in a 40 mmφ extruder having a cylinder temperature of 220° C.

Thus, four types of pellets E-1 to E-4 were formed of the graft copolymers D-1 to D-4, respectively. In addition, the powder of the graft copolymer D-5 was blended with a polycarbonate powder (commercially available from Mitsubishi Gas Chemical Company, Inc. under the trade name of IUPILON S-2000), a commercially available AS resin powder [AN/ST=26/74 (weight ratio), $\eta_{sp}/C=0.65$] or a commercially available acrylonitrile-α-methylstyrene (αMS) copolymer resin [An/αMS=20/80 (weight ratio), $\eta_{sp}/C=0.45$] in a weight ratio of 43:57. Each of the resulting blends was extruded in the same manner as described above. Thus, there were obtained three types of pellets E-5, E-6 and E-7, respectively.

Comparative Examples 1 and 2

Two types of pellets E-8 and E-9 were obtained in substantially the same manner as described in connection with the preparation of C-2, D-2 and E-2 in Example 2 and the preparation of C-4, D-4 and E-4 in Example 4, respectively. In these comparative examples, however, 0.48 parts or 0.3 parts of AMA alone (i.e., with the omission of EDMA) was used in the procedures for the preparation of the composite-structured crosslinked acrylic rubbers C-2 and C-4 in Examples 2 and 4, respectively.

Comparative Examples 3 and 4

Two types of pellets E-10 and E-11 were obtained in substantially the same manner as described in connection with the preparation of C-2, D-2 and E-2 in Example 2 and the preparation of C-3, D-3 and E-3 in Example 3, respectively. In these comparative examples, however, 0.48 part of EDMA alone or 0.48 part of DVB alone (i.e., with the omission of AMA) was used in the procedures for the preparation of the composite-structured crosslinked acrylic rubbers C-2 and C-3 in Examples 2 and 3, respectively.

EXAMPLES 8 TO 10

The powder of the graft copolymer D-5 was blended with a methyl methacrylate resin (commercially available from Mitsubishi Rayon Co., Ltd. under the trade name of ACRYPET VH), a methyl methacrylatestyrene resin (commercially available from Mitsubishi Rayon Co., Ltd. under the trade name of CLEARLAC) or an acrylonitrile-α-methylstyrene-N-phenylmaleimide copolymer [synthesized by emulsion polymerization; acrylonitrile/α-methylstyrene/N-phenylmaleimide=20/65/15 (weight ratio)] in a weight ratio of 43:57. After the addition of the same stabilizers as used in Example 1, the resulting blend was extruded. Thus, there were obtained three types of pellets E-12, E-13 and E-14, respectively.

Comparative Example 5

(A) A mixture consisting of 192 parts of BuA, 8 parts of EDMA, 1 part of triallyl cyanurate (TAC), and 5 parts of a dioctyl sulfosuccinate emulsifier (commercially available from Kao Co., Ltd. under the trade name of PELEX OTP) was thoroughly purged with nitrogen. Sepatately, 400 parts of deionized water which had been purged with nitrogen was heated to 65° C., and 1 part of potassium persulfate was dissolved therein as an initiator. Immediately thereafter, the aforesaid mixture was added dropwise thereto over a period of 110 minutes, and the reaction was continued for an additional 40 minutes to obtain a rubber polymer latex. The average particle diameter of the rubber was 0.3 μm and the solids content of the latex was 32%.

(B) Siz hundred parts (200 parts on a solid basis) of the above rubber polymer latex was mixed with 1200 parts of deionized water, purged with nitrogen, and then heated to 65° C. After the addition of a mixture consisting of 100 parts of a monomer mixture of 70% ST and 30% AN and 3 parts of benzoyl peroxode, 500 parts of a monomer mixture having the same composition as above was added dropwise thereto over a period of 230 minutes, and the reaction was continued for an additional 40 minutes to obtain a graft polymer. The rate of polymerization was 99.8%. The resulting latex was salted out with aluminum chloride (AlCl$_3$.6H$_2$O) to obtain a powder of the graft polymer (D-6). This powder was extruded in a 40 mmφ vented extruder to obtain pellets E-15.

Comparative Example 6

(A) Preparation of a crosslinked resin latex

Two hundred parts of deionized water was placed in a reaction vessel, purged with nitrogen, and then heated to an internal temperature of 80° C. After the addition of 0.06 part of potassium persulfate, a mixture having the following composition was continuously poured thereinto over a period of 30 minutes.

| Methyl methacrylate (MMA) | 2.4 parts |
| --- | --- |
| AN | 2.4 parts |
| ST | 7.2 parts |
| Triallyl isocyanurate (TAIC) | 0.06 part |
| PELEX OTP | 0.3 part |

After completion of the pouring, the exothermic reaction was finished in an hour or so. The resulting crosslinked resin latex had an average particle diameter of 0.26 μm.

(B) Preparation of a composite-structured crosslinked acrylic rubber

To the crosslinked resin latex obtained in (A) above was added 0.24 part of potassium persulfate. Then, a mixture having the following composition was continuously poured thereinto over a period of 2 hours.

| BuA | 43.2 parts |
| --- | --- |
| AN | 4.8 parts |
| TAIC | 0.24 part |
| PELEX OTP | 0.30 part |

The resulting crosslinked acrylic rubber containing a core consisting of the aforesaid crosslinked resin had a degree of swelling of 8.0, a gel content of 90%, and an average particle diameter of 0.30 μm.

(C) Preparation of a graft polymer

Into the crosslinked acrylic rubber latex obtained in (B) above, a mixture having the following composition was continuously poured over a period of 2 hours.

| MMA | 8 parts |
| --- | --- |
| AN | 8 parts |
| ST | 24 parts |
| n-Octyl mercaptan | 0.04 part |
| Benzoyl peroxide | 0.20 part |

The resulting latex was coagulated by adding it, with stirring, to 5 volumes of an aqueous solution of calcium chloride. The resulting coagulum was dehydrated by means of a centrifugal dehydrator, washed and then dried to obtain a graft polymer (D-7) having a high rubber content.

(D) Blending

Thirty-three parts of the graft polymer obtained in (C) above was blended with 67 parts of suspended particles separately prepared from a monomer mixture of 30% AN and 70% ST. Thus, the content of the composite-structured crosslinked acrylic rubber in the resulting resin composition was adjusted to 20%. After the addition of 1 part of barium stearate and 0.1 part of an ultraviolet light absorber (TINUVIN P), the resin composition was extruded in an extruder to obtain pellets E-16.

Comparative Example 7

Thirty-three parts of the graft polymer (D-7) obtained in Comparative Example 6 above was blended with 67 parts of a methyl methacrylate resin (ACRYPET VH). The resulting blend was extruded in the same manner as described in Comparative Example 6 to obtain pellets E-17.

Evaluation Methods

Using an injection molding machine (Model SAV-30A Screw Type; manufactured by Sanjoy Seiki Co.), the aforesaid pellets E-1 to E-17 and pellets of commercially available ABS, ASA and AES resins were molded under the following two types of conditions.

| Molding conditions | Cylinder temperature | Mold temperature | Specimens for evaluation |
|---|---|---|---|
| 1 | 200° C. (220° C. for E-5 and E-7) | 60° C. | (1) Specimen for notched Izod impact testing (2) Flat plate for evaluation of appearance (50 × 80 × 3 mm) |
| 2 | 270° C. (290° C. for E-5 and E-7) | 60° C. | Flat plate for evaluation of appearance (50 × 80 × 3 mm) |

Evaluations were made according to the following methods, and the results of evaluation are shown in Tables 3 and 4.

(1) Weather resistance

Using a weatherometer (Model WE-DCH Weatherometer; manufactured by Suga Test Instruments Co.), changes in gloss were measured under conditions including a black panel temperature of 83° C. and a water spray cycle of 18 minutes/120 minutes.

(2) Gloss

Gloss was measured with a digital variable-angle glossmeter (manufactured by Suga Test Instruments Co.) at an angle of incidence of 60°.

(3) Izod impact strength

Izod impact strength was measured according to the procedure described in ASTM D-256.

(4) Melt flow index (MI)

Using a melt indexer (manufactured by Toyo-Baldwin Co.), melt flow index was determined according to the procedure (200° C., 5 kg) described in ASTM D-1238.

TABLE 3

| No. | Type of graft copolymer pellets | Izod impact strength (kg · cm/cm) | MI (g/10 min.) | Appearance of molded piece*1 | Gloss (%) Molding temperature 200° C. | Gloss (%) Molding temperature 270° C. | Weather resistance—changes in gloss (%) Time in weatherometer (hours) 0 | 100 | 200 | 300 | 400 |
|---|---|---|---|---|---|---|---|---|---|---|---|
| Example 1 | E-1 | 20 | 0.9 | ○ | 91.0 | 88.3 | 91.0 | 88.1 | 86.8 | 85.9 | 85.5 |
| Example 2 | E-2 | 25 | 1.1 | ○ | 90.4 | 87.7 | 90.4 | 88.4 | 87.2 | 85.4 | 84.2 |
| Example 3 | E-3 | 24 | 1.3 | ○ | 89.7 | 87.0 | 89.7 | 87.5 | 86.3 | 85.1 | 84.1 |
| Example 4 | E-4 | 28 | 1.2 | ○ | 89.2 | 86.5 | 89.2 | 87.4 | 85.4 | 83.3 | 82.6 |
| Example 5 | E-5 | 45 | 0.3 | ○ | 88.5 (220° C.) | 85.8 (290° C.) | 88.5 | 87.0 | 85.6 | 82.5 | 79.1 |
| Example 6 | E-6 | 26 | 1.4 | ○ | 91.1 | 88.4 | 91.1 | 89.1 | 87.3 | 85.1 | 83.0 |
| Example 7 | E-7 | 14 | 0.1 | ○ | 89.2 (220° C.) | 86.5 (290° C.) | 89.2 | 86.7 | 84.0 | 83.1 | 82.0 |
| Comparative Example 1 | E-8 | 25 | 1.0 | ○ | 85.9 | 80.0 | 85.9 | 83.2 | 82.0 | 80.2 | 78.4 |
| Comparative Example 2 | E-9 | 28 | 1.1 | ○ | 84.5 | 79.3 | 84.5 | 82.3 | 80.1 | 79.2 | 77.3 |
| Comparative Example 3 | E-10 | 25 | 1.1 | ○ | 85.1 | 80.2 | 85.1 | 83.1 | 82.0 | 79.8 | 78.1 |
| Comparative Example 4 | E-11 | 24 | 1.2 | ○ | 85.1 | 80.4 | 85.1 | 82.3 | 81.0 | 79.5 | 78.6 |
| Commercial ABS resin | — | 23 | 1.5 | ○ | 81.2 | 70.3 | 81.2 | 72.1 | 65.3 | 57.3 | 47.0 |
| Commercial ASA resin | — | 22 | 1.3 | X | 58.7 | 53.1 | 58.7 | 50.2 | 43.2 | 40.7 | 36.8 |
| Commercial AES resin | — | 20 | 1.4 | Δ | 84.3 | 68.3 | 84.3 | 75.3 | 71.7 | 67.3 | 62.9 |

*1 ○—Good; Δ—Poor; X—Very poor.

TABLE 4

| No. | Type of graft copolymer pellets | Izod impact strength (kg·cm/cm) | MI (g/10 min.) | Appearance of molded piece | Gloss (%) Molding temperature | | Weather resistance—changes in gloss (%) Time in weatherometer (hours) | | | | |
|---|---|---|---|---|---|---|---|---|---|---|---|
| | | | | | 200° C. | 270° C. | 0 | 100 | 200 | 300 | 400 |
| Example 8 | E-12 | 12 | 0.2 | ○ | 83.1 | 80.2 | 83.1 | 82.0 | 82.1 | 80.1 | 75.0 |
| Example 9 | E-13 | 14 | 1.0 | ○ | 81.8 | 78.7 | 81.8 | 81.0 | 80.4 | 76.5 | 72.0 |
| Example 10 | E-14 | 6.4 | 0.02 | ○ | 88.4 | 87.9 | 88.4 | 87.2 | 82.1 | 72.3 | 65.4 |
| Comparative Example 5 | E-15 | 11.5 | 1.2 | X | 89.4 | 65.3 | 89.4 | 86.1 | 84.2 | 80.8 | 78.4 |
| Comparative Example 6 | E-16 | 10.7 | 0.9 | X | 90.8 | 89.5 | 90.8 | 89.1 | 87.2 | 85.6 | 84.7 |
| Comparative Example 7 | E-17 | 9.9 | 0.1 | ○ | 77.4 | 74.3 | 77.4 | 77.6 | 77.9 | 75.4 | 73.8 |

It is evident from the above results that, in the preparation of the thermoplastic resin compositions of the present invention comprising a graft copolymer resin formed by using a composite-structured acrylic rubber containing a core of a diene rubber, the balance between the gloss and impact strength of molded articles over a wide temperature range extending from low to high temperatures can be improved without sacrificing their attractive appearance or excellent weather resistance, through the combined use of a graft-linking agent and a cross-linking agent for the formation of a crosslinked structure in the outer layer consisting of an acrylate polymer. Specifically, it can be seen, for example, by a comparison between E-2 and E-8 or between E-4 and E-9 that the combined use of a graft-linking agent and a cross-linking agent is superior to the use of a graft-linking agent alone. Similarly, it can also be seen by a comparison between E-2 and E-10 or between E-3 and E-11 that the combined use of a graft-linking agent and a cross-linking agent is superior to the use of a cross-linking agent alone.

What is claimed is:

1. A thermoplastic resin composition having excellent impact resistance, weather resistance and moldability which comprises (A) a graft copolymer resin (3) obtained by polymerizing 10 to 95 parts by weight of at least one monomer (2) selected from the group consisting of aromatic vinyl compounds and ethylenically unsaturated compounds of the formula:

$$CH_2=CRX$$

where R is —H or —CH$_3$, X is —CN or —COOR$^1$, and R$^1$ is an alkyl group having 1 to 8 carbon atoms, in the presence of 90 to 5 parts by weight (on a solid basis) of a latex of a composite-structured crosslinked acrylic rubber (1) whose particles are composed of 2 to 80% by weight of a core consisting of a diene rubber (i) enlarged by treatment with an acid group-containing copolymer latex to an average particle diameter of 0.15–1 micron, and 20 to 98% by weight of an outer layer consisting of a crosslinked acrylate polymer (ii) derived from an acrylic ester as the main component and formed by the combined use of a graft-linking agent and a cross-linking agent, the total amount of (1) and (2) being 100 parts by weight.

2. A thermoplastic resin composition as claimed in claim 1 wherein the graft-linking agent is at least one compound selected from the group consisting of allyl methacrylate, triallyl cyanurate and triallyl isocyanurate.

3. A thermoplastic resin composition as claimed in claim 1 wherein the cross-linking agent is at least one compound selected from the group consisting of ethylene glycol dimethacrylate, 1,3-butanediol dimethacrylate and divinylbenzene.

4. A process for the preparation of a thermoplastic resin composition having excellent impact resistance, weather resistance and moldability which comprises (A) forming a graft copolymer resin (3) by polymerizing 10 to 95 parts by weight of at least one monomer (2) selected from the group consisting of aromatic vinyl compounds and ethylenically unsaturated compounds of the formula:

$$CH_2=CRX$$

where R is —H or —CH$_3$, X is —CN or —COOR$^1$, and R$^1$ is an alkyl group having 1 to 8 carbon atoms, in the presence of 90 to 5 parts by weight (on a solid basis) of a latex of a composite-structured crosslinked acrylic rubber (1) whose particles are composed of 2 to 80% by weight of a core consisting of a diene rubber (i) enlarged by treatment with an acid group-containing copolymer latex to an average particle diameter of 0.15–1 micron, and 20 to 98% by weight of an outer layer consisting of a crosslinked acrylate polymer (ii) derived from an acrylic ester as the main component and formed by the combined use of a graft-linking agent and a cross-linking agent, the total amount of (1) and (2) being 100 parts by weight.

5. A process for the preparation of a thermoplastic resin composition as claimed in claim 4 wherein the graft-linking agent is at least one compound selected from the group consisting of allyl methacrylate, triallyl cyanurate and triallyl isocyanurate.

6. A process for the preparation of a thermoplastic resin composition as claimed in claim 4 wherein the cross-linking agent is at least one compound selected from the group consisting of ethylene glycol dimethacrylate, 1,3-butanediol dimethacrylate and divinylbenzene.

* * * * *